United States Patent [19]
Millward

[11] Patent Number: 5,280,166
[45] Date of Patent: Jan. 18, 1994

[54] FLYING SPOT SCANNER BURN CORRECTOR WITH DUAL PHOTOMULTIPLIER SAMPLING AND MISMATCH SIGNAL SUPPRESSION

[75] Inventor: John D. Millward, Hitchin, United Kingdom

[73] Assignee: Rank Cintel Limited, United Kingdom

[21] Appl. No.: 793,802

[22] Filed: Nov. 18, 1991

[30] Foreign Application Priority Data

Nov. 16, 1990 [GB] United Kingdom ............... 9024984

[51] Int. Cl.$^5$ .............................................. G01J 1/32
[52] U.S. Cl. ................................. 250/205; 250/207
[58] Field of Search ............... 250/205, 207, 227.11; 315/149, 155

[56] References Cited

U.S. PATENT DOCUMENTS

| | | | |
|---|---|---|---|
| 3,917,974 | 11/1975 | Lucchesi et al. | 250/205 |
| 3,949,226 | 4/1976 | Dugan et al. | 250/205 |
| 3,992,620 | 11/1976 | Waller | 250/205 |

OTHER PUBLICATIONS

IBM Technical Disclosure Bulletin, vol. 5, No. 9 (1963) pp. 110 to 111 K. M. Trampel and H. H. Jensen, "Calibration of Photographic Scanning System".

*Primary Examiner*—David C. Nelms
*Attorney, Agent, or Firm*—Ostrolenk, Faber, Gerb & Soffen

[57] ABSTRACT

Two photomultipliers (14,16) are arranged one on either side of a CRT (10) primary optical axis adjacent the imaging lens. High frequency components of the detected CRT brightness signal from the two photomultipliers are applied to the "gate" 32. When the signals are equal, one or other of the signals will be selected by the "gate". When the signals are unequal, the lower one will be rejected. Thus signals caused by faceplate (22) dirt are eliminated, since they appear displaced in time from the photomultipliers, due to the spacing of the dirt from the scanning beam and the spacing of the photomultipliers. Phosphor grain and blemish signals occur at the outputs of the photomultipliers simultaneously and are allowed through the "gate" to provide correction and attenuation of these unwanted signals.

13 Claims, 4 Drawing Sheets

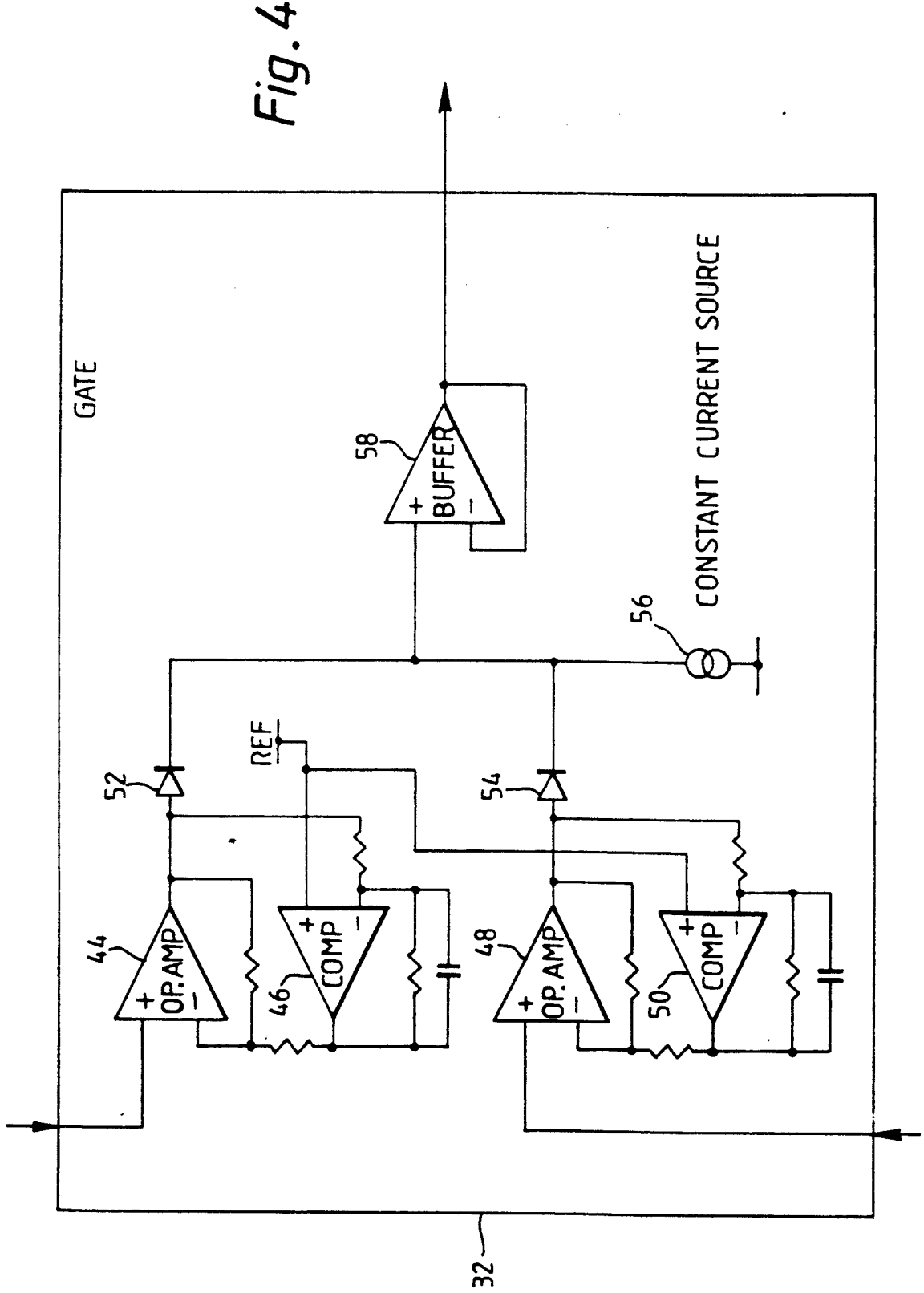

FLYING SPOT SCANNER BURN CORRECTOR WITH DUAL PHOTOMULTIPLIER SAMPLING AND MISMATCH SIGNAL SUPPRESSION

FIELD OF THE INVENTION

This invention relates to flying spot scanners and in particular, but not exclusively, to scanners used in telecines or film writers to scan film.

BACKGROUND TO THE INVENTION

The efficiency of Cathode Ray Tube (CRT) phosphors normally decreases with use. If the scan is moved or changed in any way during use, the brightness of the phosphor will vary over the used scan area in a random way giving rise to what is called a burn pattern.

It is very difficult, if not impossible, to manufacture a CRT phosphor screen with no blemishes and an insignificant grain structure. Even after careful processing and selection, there will always remain a few blemishes of small size and amplitude, and a detectable grain structure. For the purposes of this specification, burn correction should be regarded as correcting for errors originating from the phosphor screen such as phosphor burn, grain pattern and blemishes.

The above errors can be removed by a burn corrector, and one well known method uses a photomultiplier to measure or monitor the CRT brightness and uses the signal so generated to modulate the video signals and correct the error.

A further problem affecting signal integrity is dirt on the CRT faceplate. Even though many precautions are taken to eliminate dirt, one speck of dirt can cause annoyance.

The dirt on the faceplate is displaced from the phosphor by the thickness of the faceplate. It is therefore necessary that the burn and dirt detector are on the same optical axis as the film scanning axis to ensure correct spatial registration of the dirt and burn correcting signal with the main signal it is going to modulate.

DESCRIPTION OF PRIOR ART

To achieve this ideal situation, it would be necessary to introduce a semireflecting mirror between the lens and the film, centered on the main optical axis. This is very difficult to achieve in practice and has the disadvantage of removing 50% of the light from the main path, resulting in an inferior signal to noise ratio.

The solution conventionally adopted in the art is a compromise in which the burn detector is placed off axis, outside the main light path. Due to parallax error, only burn errors, blemishes and grain in the phosphor can be corrected. The dirt component of the signal, instead of correcting the dirt errors, produces a reverse polarity signal at the wrong location, making the situation worse. To minimise this problem, the CRT has to be kept absolutely clean, which is possible most of the time. The burn corrector only compensates for burn, phosphor blemishes and grain, which cannot be eradicated manually. Most films are transferred from Telecine to Video Tape before transmission and if a speck of dirt causes too much annoyance, the CRT can be cleaned and the film re-recorded. Thus, the known burn correctors can only compensate off imperfections on the phosphored surface of the CRT face plate.

SUMMARY OF THE INVENTION

The reverse polarity misregistered dirt signal actually causes more annoyance to the viewer than the dirt itself and the present invention aims to provide a burn corrector which does not produce the misregistered dirt correcting signal while still producing the burn, blemish and grain correction signals.

In its broadest form the invention provides at least two photomultipliers arranged off the optical axis of the flying spot scanner. Suitable circuitry identifies the presence of a dirt signal in the signal produced by either photomultiplier and eliminates the signal.

More specifically the invention provides a burn corrector for a flying spot scanner, the scanner comprises a cathode ray tube (CRT) having a faceplate and a primary optical axis, the corrector comprising at least two photomultipliers disposed off the optical axis to detect CRT brightness and generate a correction signal dependent thereon, and means for processing the output signal from each photomultiplier to produce a combined correction signal, the processing means comprising means for suppressing the output from the photomultipliers at a given instant to remove from the correction signal components present in only one photomultiplier output signal at that instant.

Preferably the photomultipliers are arranged adjacent the imaging lens, one on each side of the axis in a common plane.

A burn corrector embodying the invention has the advantage that if there is a dirt on the faceplate, the burn corrector does not produce a correction signal so that the misregistering associated with the prior art correctors is avoided. The corrector has the further advantage that other factors which cause misregistration, for example discontinuities on the outer surface of the faceplate, are also ignored.

The use of two photomultipliers has the further advantages of improving the signal to noise ratio of the burn corrector signal path as light detection is improved; horizontal and vertical shading errors generated by the burn detectors are reduced after summation and more nearly symmetrical; this reduces the amount of work that the shading corrector has to do and so decreases its required range. The invention also resides in the broad idea of a burn corrector having two or more off axis photomultipliers.

Preferably, the signal produced by each photomultiplier is split into high and low frequency components and the output suppressing means only suppresses the high frequency components. This arrangement is preferred as dirt is usually only present as small particles producing high frequency error signals. Larger dirt particles are often removed by cleaning or blowing air over the faceplate.

Preferably the suppressing means comprises a gate which has as its first input the high frequency output of the first photomultiplier in analogue or digital form and as its second input the high frequency output of the second photomultiplier, also in analogue or digital form. The gate produces an output only when both inputs are high. Thus burn, blemish and grain errors emanating from the outside of the faceplate are not suppressed as they arrive at the gate simultaneously.

BRIEF DESCRIPTION OF THE DRAWINGS

FIG. 4 shows an analogue implementation of gate 32 of FIGS. 1 or 2.

DESCRIPTION OF PREFERRED EMBODIMENT

Figure 1:
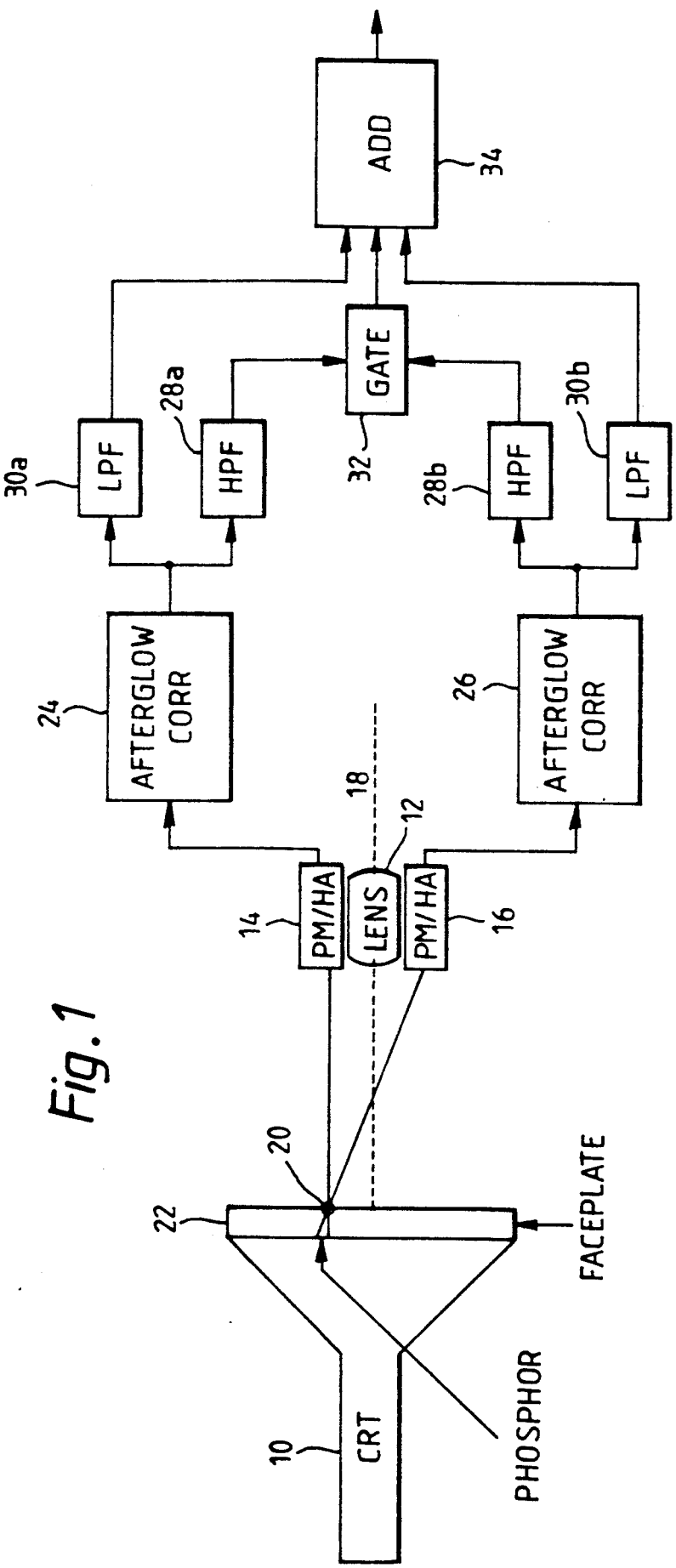
FIG. 1 is a general schematic diagram of a preferred embodiment of the invention for analogue or digital implementation.

The FIG. 1 shows a flying spot CRT 10 and lens 12 used to scan the film. Adjacent the lens are two photo-multipliers 14, 16 which do not interfere with the light input to the lens and are arranged as near as possible to the central optical axis.

The small circle 20 on the outer surface of the faceplate 22 represents a speck of dirt. Since the electron beam of the CRT scans the phosphor on the inner surface of the faceplate, the reduction in signal due to the dirt at the photomultiplier outputs occur at different times due to the parallax error caused by the thickness of this faceplate. The dirt signal appears at different times at the photomultiplier outputs. If these dirt signals are gated, that is processed to produce an output which only goes negative, if both photomultiplier outputs are negative, then the negative going inverted dirt signal will disappear. Blemish, grain and burn signals occur at the same time at each photomultiplier as there is no parallax error associated with these signals, and therefore appear at the output of the AND gate.

In the embodiments illustrated the photomultipliers 14, 16 are off-axis causing low frequency shading errors in the photomultiplier signals. The output of each photomultiplier is processed by respective afterglow corrector 24, 26 to remove unwanted CRT afterglow effects. After afterglow correction, both signals are split into high and low frequency bands by complementary high pass and low pass filters 28a, b, 30a, b. the high frequency signals are gated at 32 and then added to the low frequency signals by adder 34 to provide a full bandwidth correction signal. The high frequency band is approximately the upper 80% of the signal bandwidth.

The High Pass Filters 28a, b remove the low frequency shading errors due to the offset photomultipliers, so that the two dirt signals have the same mean level at the input to the gate 32. This assumes that the dirt signal falls within the high frequency band. This assumption is usually valid since air filtering, which is conventional with flying spot scanners, would remove large particles of dirt which might give rise to low frequency dirt signals. The total burn signal at the output of the adder, where high frequency dirt signals have been removed, is then used in the normal way to modulate the primary video channels to correct burn, blemish and grain errors. As mentioned previously, gate 32 does not remove high frequency burn, blemish and grain signals.

It is preferred that the photomultipliers are arranged, as shown, in a common plane one on each side of the axis adjacent the lens. However, this is not essential. The photomultipliers may be on the same side of the axis, remote therefrom and in different planes. The arrangement shown has the advantage of symmetry which reduces shading errors as described below.

Figure 2:
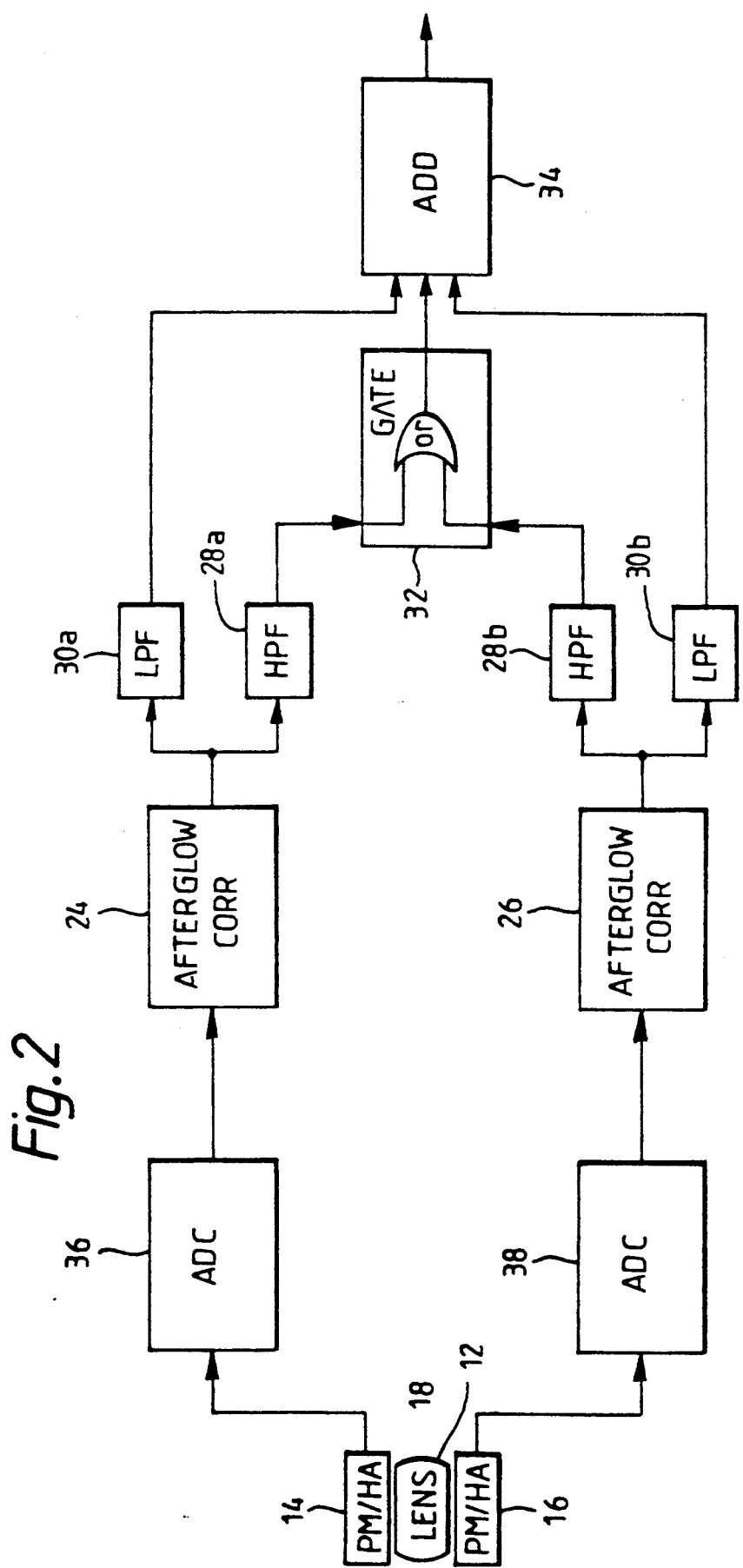
FIG. 2 is a schematic diagram of a digital implementation.

FIG. 2 includes the ADC converters 36 and 38 for a digital implementation. Although shown before afterglow correctors 24, 26, the ADCs 36, 38 could be included after correctors 24. Here the "GATE" 32 is shown as a simple "or" function with positive logic, which means in simple terms that the most positive of the two input signals to the "GATE" passes to the output. This assumes that peak white signal is positive, and that unwanted dirt causes a negative excursion.

Figure 3:
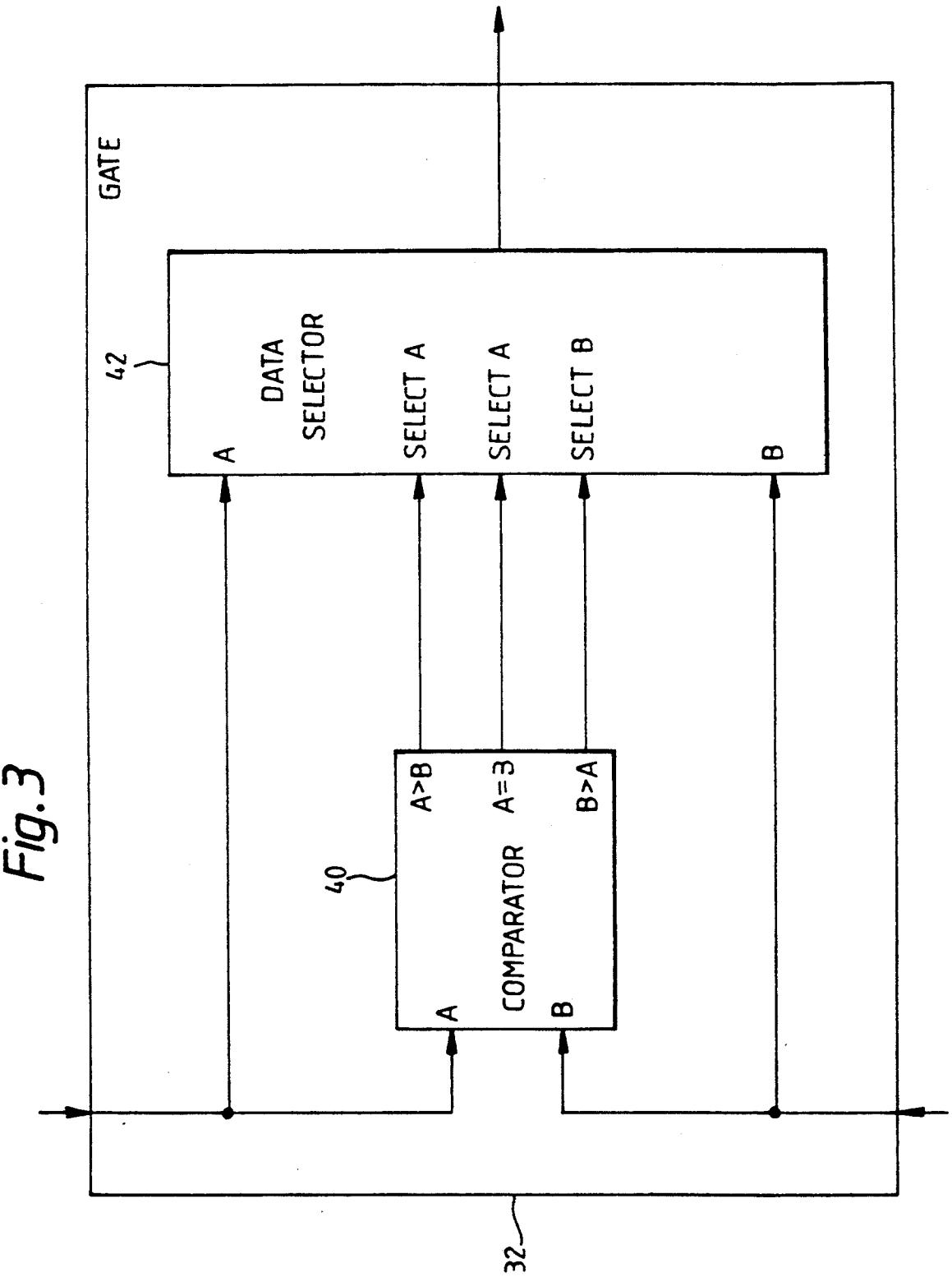
FIG. 3 is a more detailed diagram showing a digital implementation of gate 32 in FIG. 2.

As a digital picture signal consists of many bits a simple "or" function is not suitable in practice. FIG. 3 shows a practical implementation of a digital "GATE", wherein comparator 40 compares the outputs from the high pass filters and enables a data selector 42 to select the larger signal, again assuming that peak white is positive so that dirt causes a negative excursion of the signal. When no dirt is present, the signals will be equal and either of the signals can be selected. Here signal A is shown as selected.

FIG. 4 shows an analogue implementation of the "GATE" 32, of FIG. 1. High frequency input signals are connected to operational amplifiers 44 and 48. The output of the amplifiers are connected to matched diodes 52 and 54 respectively, with the junction of the two diodes being connected to an output buffer 58. Constant current source 56 ensures that a constant current flows out of the diode junction whatever the signal amplitude at that junction.

It is essential that when the incoming signals to the gate are equal, the currents through the diodes should also be equal and therefore besides requiring matched diodes, the mean potential at the outputs of the operational amplifiers also needs to be equal. Therefore, to remove any mean potential errors, the outputs of the operational amplifiers are compared with a common reference by comparators 46 and 50, which are also high gain integrating amplifiers, the outputs of which are connected to the input of the respective operational amplifiers, thus stabilising the mean potentials, and the currents through the diodes.

The signal amplitude at the input to the "GATE" is typically 2.5 v and the current through each diode 10 milliamps. Dirt on the tube faceplate would cause negative excursions of 2.5 v to 2.5 v on these input signals but at different times. If the input to OP.AMP 48 dropped due to dirt while the input of OP.AMP 44 stayed high, then diode 54 would cut off and the 10 milliamps that was flowing through it would now flow through diode 52 to give a total of 20 milliamps in that diode giving rise to a drop in potential of approximately 25 millivolts, thus alternating the dirt signal to 1% of the peak signal.

The number of photomultipliers is not limited to two, for example, in high definition telecine it has been proposed to use two photomultipliers for each colour component of the video signal; six multipliers in all. This necessary as the phosphor has been found to exhibit different grain effects with each colour.

Although described with reference to dirt signal elimination, the use of two photomultipliers has many other advantages. for example, light collection is improved so that the signal to noise ratio in the burn signal path is improved. Also, horizontal and vertical shading errors generated by the burn detectors are smaller after summation and more nearly symmetrical. This means then the scanner shading corrector has to do less work and can have a smaller range.

The burn corrector can be used with any system in which a flying spot scanner is used, for example, in a flying spot telecine of a flying spot film writer.

We claim:

1. A burn corrector for a flying spot scanner, the scanner comprising a cathode ray tube (CRT) having a faceplate and a primary optical axis;

the corrector comprising:

first and second photomultipliers each disposed off said primary optical axis to detect CRT brightness and generate an output signal dependent upon CRT brightness detected thereby; and processing means for processing said output signals from said photomultipliers to produce a combined correction signal; wherein said processing means comprises:

output suppression means for suppressing at least a portion of said output signals from both of said photomultipliers at a given instant to remove from said combined correction signal, components that are present in only one of said output signals at that instant.

2. A burn corrector according to claim 1, further comprising:

high pass filter means interposed between said photomultipliers and said output suppression means whereby the output suppression means acts only on high frequency components derived from said output signals.

3. A burn corrector according to claim 2;

wherein the suppression means comprises:

gate means arranged to open only when high frequency signals derived from both of said output signals are essentially equal.

4. A burn corrector according to claim 3; wherein the gate means comprises;

comparator means and data selector means;

and wherein said output signals may include negative and positive peak white signals;

the comparator means operating to compare said outputs from each of said photomultipliers, and said data selector means selecting a larger output signal when receiving a peak white signal that is positive and selecting a smaller output signal when receiving a peak white signal that is negative.

5. A burn corrector according to claim 4, wherein the gate means further comprises:

a matched pair of diodes operatively connected at a junction, and a pair of amplifier means each having an input operatively connected to an individual one of said photomultipliers; each amplifier means of said pair of amplifier means having an output connected to a respective one of said matched pair of diodes;

means for maintaining a constant current at the junction;

and means for biasing said amplifier means to equalise mean potentials for each of the amplifier means.

6. A burn corrector according to claim 2, further comprising:

an adder; and a low pass filter means interposed between each of said photomultipliers and said adder;

gate means interposed between said high pass filter means and said adder wherein said adder sums outputs of the gate means and the low frequency filter to produce said combined correction signal.

7. A burn corrector according to claim 1, wherein said photomultipliers are arranged in plane one on each side of said primary axis.

8. A burn corrector according to claim 1, wherein said photomultipliers are arranged adjacent an imaging lens of said flying spot scanner cathode ray tube.

9. A burn corrector according to claim 1, wherein said flying spot scanner generates a beam from which video signals are derived; said video signals including a plurality of colour components; said first and second photomultipliers constituting a pair of photomultipliers for processing a first of said colour components, said burn corrector also including an additional individual pair of photomultipliers for processing each additional colour component of said plurality of colour components.

10. A burn corrector for a flying spot scanner having a cathode ray tube and a primary optical axis comprising:

at least two photomultipliers arranged off the primary optical axis of the scanner, the photomultipliers being arranged to detect the brightness of light from the cathode ray tube to derive an afterglow correction signal.

11. A burn corrector according to claim 10 wherein said photomultipliers are arranged in plane one on each side of said primary axis.

12. A burn corrector according to claim 10, wherein said photomultipliers are arranged adjacent an imaging lens of said flying spot scanner cathode ray tube.

13. A burn corrector according to claim 10, wherein said flying spot scanner generates a beam from which video signals are derived; said video signals including a plurality of colour components; said first and second photomultipliers constituting a pair of photomultipliers for processing a first of said colour components, said burn corrector also including an additional individual pair of photomultipliers for processing each additional colour component of said plurality of colour components.

* * * * *